(12) United States Patent
Biasutto et al.

(10) Patent No.: US 11,702,304 B2
(45) Date of Patent: Jul. 18, 2023

(54) LOADING-DOCK SIGNALING SYSTEM INCORPORATING A WHEEL CHOCK HAVING AN ILLUMINATED SIGNAL

(71) Applicant: Blue Giant Equipment Corporation, Mississauga (CA)

(72) Inventors: Gerard Biasutto, Mississauga (CA); Paulo Cruz, Mississauga (CA); David Andrew Rimmer, Mississauga (CA)

(73) Assignee: Blue Giant Equipment Corporation, Mississauga (CA)

(*) Notice: Subject to any disclaimer, the term of this patent is extended or adjusted under 35 U.S.C. 154(b) by 59 days.

(21) Appl. No.: 17/320,638

(22) Filed: May 14, 2021

(65) Prior Publication Data

US 2021/0354939 A1    Nov. 18, 2021

Related U.S. Application Data

(60) Provisional application No. 63/024,699, filed on May 14, 2020.

(51) Int. Cl.
*B65G 69/00* (2006.01)
*G08B 5/38* (2006.01)
*G08C 23/06* (2006.01)
*B65G 69/24* (2006.01)

(52) U.S. Cl.
CPC ............. *B65G 69/005* (2013.01); *G08B 5/38* (2013.01); *G08C 23/06* (2013.01); *B65G 69/24* (2013.01); *B65G 2203/0283* (2013.01); *B65G 2203/047* (2013.01)

(58) Field of Classification Search
CPC ....... B65G 69/003; B65G 69/005; G08B 5/38
See application file for complete search history.

(56) References Cited

U.S. PATENT DOCUMENTS

| 5,882,167 | A | 3/1999 | Hahn et al. |
| 6,123,496 | A | 9/2000 | Alexander |
| 6,336,527 | B1* | 1/2002 | Metz ................... B60T 3/00 188/32 |
| 6,371,253 | B1 | 4/2002 | Berends et al. |
| 6,690,287 | B2 | 2/2004 | Jette et al. |
| 7,032,720 | B2* | 4/2006 | Jette ................. B65G 69/005 188/32 |
| 7,226,265 | B2 | 6/2007 | Wilson |
| 7,264,092 | B2 | 9/2007 | Jette |
| 7,999,680 | B2 | 8/2011 | Penot |
| 8,006,811 | B2 | 8/2011 | Andersen et al. |

(Continued)

FOREIGN PATENT DOCUMENTS

| EP | 2292481 | | 3/2011 | |
| EP | 2404795 | A1 * | 1/2012 | ............ B60T 3/00 |

(Continued)

*Primary Examiner* — Kaitlin S Joerger
(74) *Attorney, Agent, or Firm* — Price Heneveld LLP

(57) ABSTRACT

A loading-dock signaling system includes an internal signal light, an external signal light and a wheel chock having a base and a handle extending from the base. A chock signal light is positioned on the handle. The internal signal light, the external signal light and the chock signal light are in signal communication with one another to provide at least a plurality of illuminated indicia to an exterior dock area and an interior dock area. The exterior dock area and the interior dock area are separated by a dock door.

18 Claims, 12 Drawing Sheets

(56) References Cited

U.S. PATENT DOCUMENTS

| | | |
|---|---|---|
| 8,286,757 B2 | 10/2012 | Nelson |
| 8,307,956 B2 | 11/2012 | Andersen et al. |
| 8,443,945 B2 | 5/2013 | Perkins |
| 8,465,245 B2 | 6/2013 | Manone et al. |
| 8,616,826 B2 | 12/2013 | Cotton et al. |
| 9,126,775 B2 | 9/2015 | Brooks et al. |
| 9,145,273 B2 | 9/2015 | Brooks et al. |
| 9,212,797 B2 | 12/2015 | Jeong |
| 9,539,995 B2 | 1/2017 | Metz et al. |
| 9,751,702 B1* | 9/2017 | Hoofard ............... B60T 3/00 |
| 10,053,904 B2 | 8/2018 | McNeill et al. |
| D830,280 S | 10/2018 | Erickson |
| 10,113,352 B2 | 10/2018 | McNeill et al. |
| 10,179,572 B2 | 1/2019 | Metz et al. |
| 10,329,105 B2 | 6/2019 | Hoofard et al. |
| D857,602 S | 8/2019 | Sveum et al. |
| D875,640 S | 2/2020 | Sveum et al. |
| 10,676,295 B1 | 6/2020 | Manone ............... B65G 69/005 |
| 11,195,389 B1* | 12/2021 | Walker ............... G08B 5/24 |
| 2003/0159892 A1* | 8/2003 | Jette ............... B60T 3/00 188/32 |
| 2005/0226705 A1* | 10/2005 | Wilson ............... B65G 69/005 414/401 |
| 2008/0124203 A1 | 5/2008 | McDonald |
| 2009/0026022 A1* | 1/2009 | Andersen ............... B60T 3/00 188/32 |
| 2016/0090072 A1* | 3/2016 | Metz ............... B65G 69/005 188/1.11 E |
| 2018/0345946 A1* | 12/2018 | Bowman ............... B60T 3/00 |
| 2020/0111333 A1* | 4/2020 | Liivik ............... G08B 5/00 |
| 2020/0290587 A1* | 9/2020 | Duffy ............... B60T 17/22 |
| 2021/0354939 A1* | 11/2021 | Biasutto ............... G08B 5/38 |

FOREIGN PATENT DOCUMENTS

| | | | |
|---|---|---|---|
| FR | 2672578 | 8/1992 | |
| FR | 2736336 A1 * | 1/1997 | .......... B65G 69/005 |
| FR | 2914914 | 10/2008 | |
| FR | 3031734 A1 * | 7/2016 | ............... B60T 3/00 |
| WO | WO-2019091644 A1 * | 5/2019 | .......... B65G 69/005 |
| WO | WO-2020093178 A1 * | 5/2020 | ............... B60T 3/00 |
| WO | WO-2021073952 A1 * | 4/2021 | .......... B65G 69/005 |

* cited by examiner

FIG. 8

| State of Door | Stage/Sequence of Operation | Door | Chock | External Signal Light | Wheel Chock | Chock Signal Light | Internal Signal Light | Comment |
|---|---|---|---|---|---|---|---|---|
| Door is closed | BG Ready | x | x | | Wheel chock is at Storage position | | | Blue Genius is ready, Dock is unoccupied |
| | | | | | | | | Internal signal light shows "Solid Red" |
| | | | | | | | | Wheel chock shows no sign of light as it is at stored position |
| | | | | | | | | External signal light show "Solid Green" |
| Door is closed | Engage Chock | ✓ | x | | Truck driver removes chock from storage position | | | On Blue Genius control box, the LCD screen displays "Engage chock" |
| | | | | | | | | Internal signal light shows "Solid Red" |
| | | | | | | | | External signal light show "Solid Red" |
| | | | | | | | | Dock operator is not allowed to open door |
| | | | | | | | | Chock signal light shows "Flashing White" as it is removed from Stored position (indicating something has to be done) |
| Door is closed | Chock Engaged | ✓ | x | | Wheel chock is engaged in securing position | | | When wheel chock is engaged properly, the Chock signal light shows "Solid Red" |
| | | | | | | | | External signal light show "Solid Red" |
| | | | | | | | | Internal signal light shows "Flashing Amber" signaling attention to Dock operator |
| Door is open | Door Open | ✓ | x | | Wheel chock is engaged and not to be removed | | | Door is opened (Not fully open) |
| | | | | | | | | Chock signal light changes from "Solid Green" to "Solid Red" |
| | | | | | | | | Internal signal light show "Solid Red" |
| Door is open | Dock Deployed | ✓ | ✓ | | Wheel chock is engaged and not to be removed | | | Door is fully open and Dock is deployed |
| | | | | | | | | Dock is deployed |
| | | | | | | | | Internal signal light show "Solid Green" |
| | | | | | | | | External signal light show "Solid Red" |
| | | | | | | | | Chock signal light show "Solid Red" |

| State of Door (20) | Stage/Sequence of Operation (22) | Chock | Door | Lever | External Signal Light (52) | Wheel Chock (10) | Chock Signal Light (58) | Internal Signal Light (50) | Comment (60) |
|---|---|---|---|---|---|---|---|---|---|
| Door is closed | Door Restored | ✓ | | ✗ | (image) | Wheel chock is engaged and not to be removed | (image) | (image) | Dock is restored<br>Internal signal light shows "Solid Red"<br>External signal light show "Solid Red"<br>Chock signal light show "Solid Red" |
| Door is closed | Door Closed/ Disengage Chock | ✓ | ✗ | ✗ | (image) | Wheel chock is engaged and can be removed | (image) | (image) | Door is closed completely<br>Dock operator pushes "Release restraint" button for the chock signal light to flash. "Flashing White" on Chock signal light showing to remove the chock<br>Internal signal light shows "Solid Red"<br>External signal light shows alternate "Flashing Red" and "Flashing Green" |
| Door is closed | BG Ready | ✗ | ✗ | ✗ | (image) | Wheel chock is at stored position | (image) | (image) | Blue Genius is ready<br>Internal signal light shows "Solid Red"<br>External signal light show "Solid Green"<br>Chock signal light shows no sign as it is at home position |

FIG. 9

| State of Door | Fault Condition | Code: Chock / Door / Lever / Trailer | | | | External Signal Light | Outside Alarm | Wheel Chock | Chock Signal Light | Internal Signal Light | Inside Alarm | Comment |
|---|---|---|---|---|---|---|---|---|---|---|---|---|
| Door is open | Wheel chock removed after dock deployment/ door open | x | ◊ | x | x | (red) | ON | Wheel chock is at Storage position | (flashing) | (red) | ON | Inside and Outside Alarm triggers<br>Internal signal light show "Flashing Red"<br>External signal light show "Solid Red"<br>Chock signal light show "Flashing Red" |
| Door is closed | Wheel chock engaged and dock operator doesn't notice from inside | ◊ | x | x | | (red) | OFF | Truck driver removes chock from storage position | (green) | (red) | OFF | External signal light show "Solid Red"<br>Chock signal light show "Solid Green"<br>Internal signal light show "Flashing Red" |
| Door is closed | Wheel chock removed after cycle completed, removed it from engage position and not placed at home (left on ground) | x | x | x | | (red) | ON for 5 Minutes | Wheel chock is engaged in securing position | (flashing) | (red) | OFF | External signal light show "Solid Red"<br>Outside Audio alarm triggers after 15-30 seconds<br>After 5 Minutes, Inside traffic light shows "Flashing Red"<br>Chock signal light show "Flashing Green" |
| Door is closed | Door closed after operation & Truck driver didn't notice | ◊ | x | | | (red) | ON for 5 Minutes | Wheel chock is engaged and not to be removed | (green) | (red) | OFF | External signal light show "Solid Red"<br>Internal signal light show "Solid Red"<br>Outside Audio alarm triggers after 15-30 seconds<br>Chock signal light show "Solid Green" |
| Door is closed | Trailer left overnight with door close | ◊ | x | x | | (red) | ON for 5 Minutes | Wheel chock is engaged and not to be removed | (green) | (red) | OFF | External signal light show "Solid Red"<br>Chock signal light show "Solid Green"<br>Internal signal light show "Flashing Red" |

FIG. 10

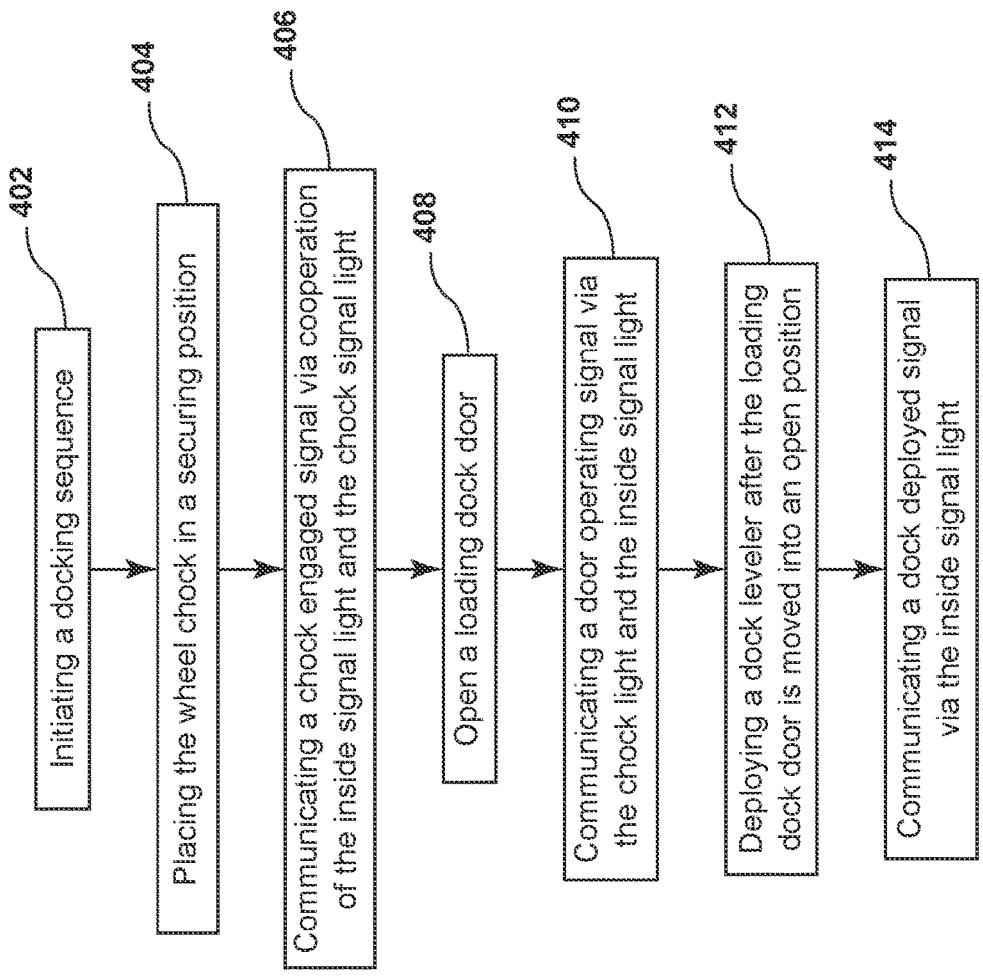

LOADING-DOCK SIGNALING SYSTEM INCORPORATING A WHEEL CHOCK HAVING AN ILLUMINATED SIGNAL

CROSS-REFERENCE TO RELATED APPLICATION

This application claims priority to and the benefit under 35 U.S.C. § 119(e) of U.S. Provisional Patent Application No. 63/024,699, filed on May 14, 2020, entitled LOADING-DOCK SIGNALING SYSTEM INCORPORATING A WHEEL CHOCK HAVING AN ILLUMINATED SIGNAL, the entire disclosure of which is hereby incorporated herein by reference.

FIELD OF THE INVENTION

The present invention generally relates to loading dock systems, and more specifically, a signaling system used in conjunction with a loading dock system for alerting inside and outside personnel of the status of various components of the loading dock.

BACKGROUND OF THE INVENTION

Distribution facilities and other similar locations used for loading and unloading of goods utilize loading docks for transferring goods to and from vehicles. Use of these loading docks can include various signaling systems that inform personnel in the vicinity whether the conditions are appropriate for accessing or moving the vehicle. These signaling systems usually include interior and exterior signals that communicate information to the driver of the vehicle, loading dock personnel and others.

SUMMARY OF THE INVENTION

According to one aspect of the present invention, a loading-dock signaling system includes an internal signal light, an external signal light and a wheel chock having a base and a handle extending from the base. A chock signal light is positioned on the handle. The internal signal light, the external signal light and the chock signal light are in signal communication with one another to provide at least a plurality of illuminated indicia to an exterior dock area and an interior dock area. The exterior dock area and the interior dock area are separated by a dock door.

According to another aspect of the present invention, a loading dock assembly includes a loading dock door that selectively separates an interior dock area from an exterior dock area. A wheel chock includes a base and a handle extending from the base. A loading-dock signaling system includes an internal signal light, an external signal light and a chock signal light. The chock signal light includes a multi-chromatic lighting element attached to the handle and that illuminates according to a status of at least the loading dock door and the wheel chock.

According to one aspect of the present invention, a method of operating a loading dock signal system having an external signal light, an inside signal light and a wheel chock. The method includes initiating a docking sequence via a controller. The external signal light and a chock signal light of the wheel chock cooperate to alert an outside operator to place the wheel chock in a securing position relative to a vehicle. The wheel chock is placed in the securing position relative to the vehicle. A chock engaged signal is communicated via cooperation of the inside signal light and the chock signal light. A loading dock door is opened. A door operating signal is communicated via the chock signal light and the inside signal light. A dock leveler is deployed after the loading dock door is moved into an open position. A dock deployed signal is communicated via the inside signal light. The dock leveler is restored. A dock restored signal is communicated via the inside signal light. The loading dock door is closed. A door closed signal is communicated via the external signal light and the chock signal light. The wheel chock is moved from the securing position to a stored position. A loading dock ready signal is communicated via the inside signal light, the external signal light and the chock signal light.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 8 is a schematic diagram illustrating an exemplary process for parking a trailer at a loading dock using an aspect of the loading-dock signaling system;

FIG. 9 is a schematic diagram illustrating a flow diagram for moving a trailer away from a loading dock using the loading-dock signaling system;

FIG. 10 is a schematic diagram illustrating various exception conditions that can be communicated using the loading-dock signaling system;

FIG. 11 is a linear flow diagram illustrating a method for parking a trailer at a loading dock utilizing the loading-dock signaling system.

DETAILED DESCRIPTION OF THE PREFERRED EMBODIMENTS

Figure 1:
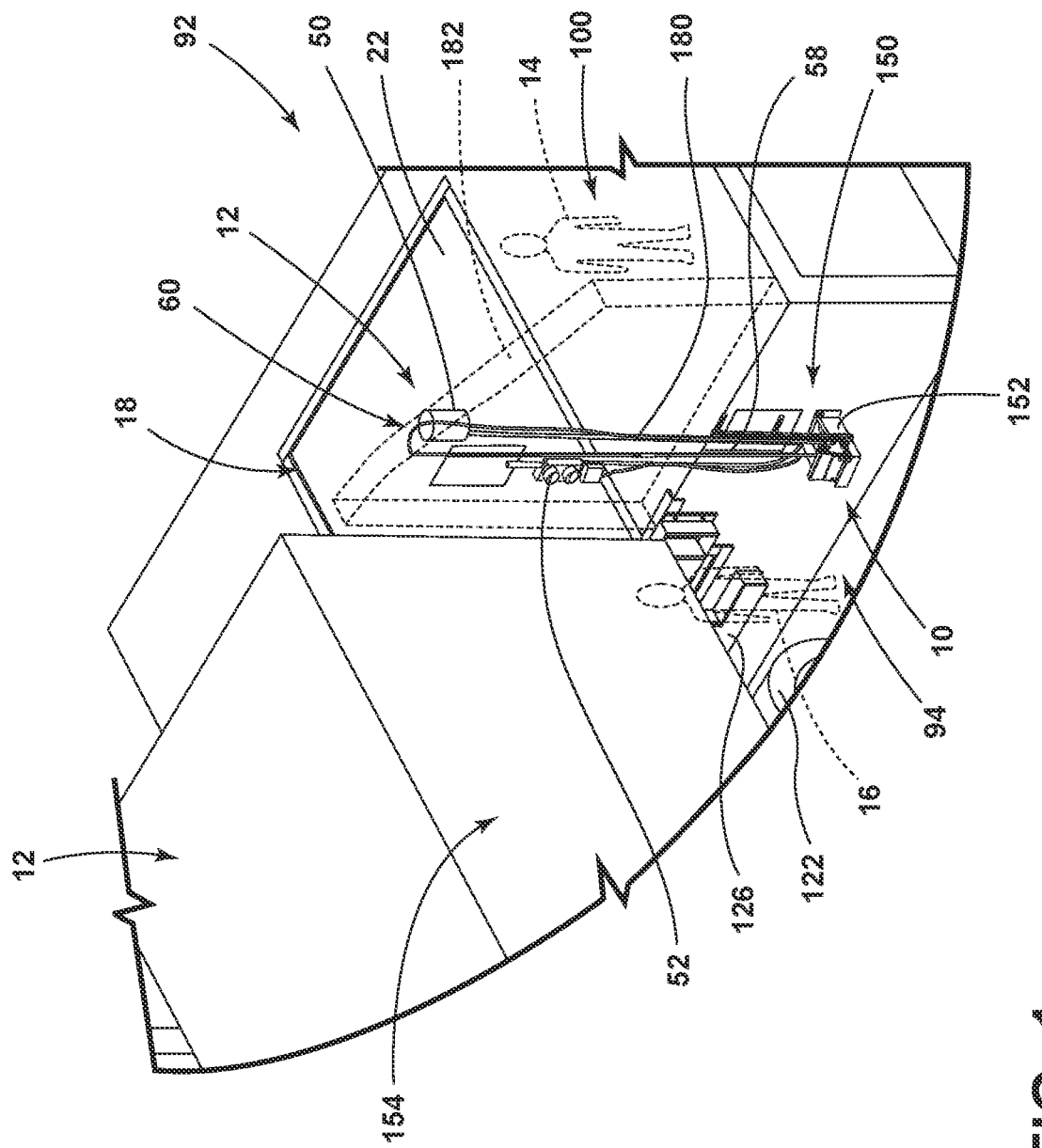
FIG. 1 is a schematic perspective view of an aspect of the signaling system installed relative to a loading dock and shown with a trailer parked at the loading dock.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With respect to FIGS. 1-10, reference numeral 10 generally refers to a wheel chock that is used in conjunction with a loading-dock signaling system 12. The loading-dock signaling system 12 alerts inside personnel 14 and outside personnel 16 about the status of various components of the loading dock 18. These components typically include the wheel chock 10, a door 20 of the loading dock 18, a dock leveler 22 of the loading dock 18, and other similar components. In certain instances, the loading-dock signaling system 12 can also be used to locate the vehicle 24 relative to the loading dock 18.

Referring again to FIGS. 1-10, according to various aspects of the device, the loading-dock signaling system 12 includes an internal signal light 50, an external signal light 52 and the wheel chock 10 having a base 54 and a handle 56 extending from the base 54. One or more chock signal lights 58 are positioned on the wheel chock 10, typically on the handle 56. The internal signal light 50, the external signal light 52 and the chock signal lights 58 are each in signal communication with a controller 60 and with one another. This signal communication provides at least a plurality of illuminated indicia 62 to the inside personnel 14 and to the outside personnel 16.

According to various aspects of the device, the chock signal lights 58, typically a plurality of chock signal lights 58, are in the form of a multi-chromatic lighting element 90. This lighting element can be in the form of a multi-chromatic illuminated strip light that extends along a surface of the handle 56. The chock signal lights 58 can also be in other configurations of lighting elements 90, typically light emitting diode (LED) elements. In this manner, the chock signal light 58 can be used to provide the plurality of illuminated indicia 62 via the one or more lighting elements 90. In addition, the chock signal light 58 can also provide various patterns of illuminated indicia 62. These patterns can be in the form of switching the color of the illuminated indicia 62, turning the lighting elements 90 on and off in a particular pattern, combinations thereof and other similar lighting patterns. These patterns and colors of the illuminated indicia 62 can be used to provide various communications and information to outside personnel 16 that are typically positioned within an exterior dock area 94 of the loading dock 18. It is contemplated that the outside personnel 16 of the loading dock 18 can include truck drivers, parking assist personnel, vehicle operators, and other similar personnel that are typically located in the exterior dock area 94 of a dock structure 92. In addition, the external signal light 52 is also used to communicate various information to the outside personnel 16. The external signal light 52 can operate independently and also in cooperation with the internal signal light 50 and the chock signal light 58.

The internal signal light 50 is typically used to provide communicative information to the inside personnel 14 that are typically positioned within an interior dock area 100 of the loading dock 18. These inside personnel 14 can include dock leveler operators, door operators, fork lift operators, loading and unloading personnel and other similar personnel that are located proximate the interior dock area 100 of the dock structure 92. In various situations, when a vehicle 24 is parked at the dock structure 92, the vehicle 24 can engage the loading dock 18 such that there is no view through the door 20 of the loading dock 18. Accordingly, a signaling system that simultaneously communicates information to inside personnel 14 and outside personnel 16, when they cannot see one another, is useful for efficient performance of various operations of loading dock 18. Typically, the exterior dock area 94 and the interior dock area 100 are separated by the door 20 of the loading dock 18. The loading-dock signaling system 12 described herein provides this information via the interior signal light, the exterior signal light and the chock signal light 58, which operate in a cooperative manner, as will be described more fully below.

Figure 2:
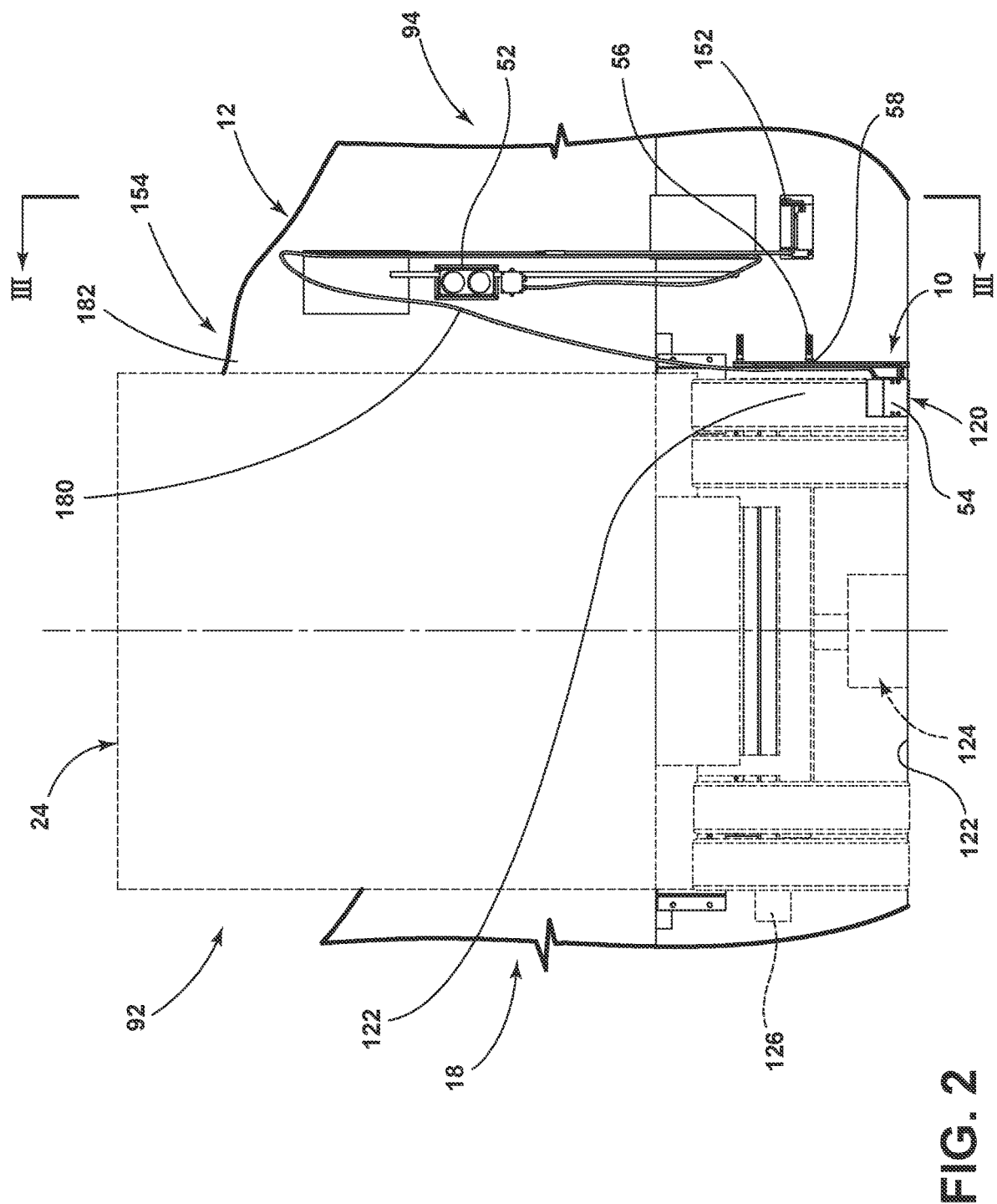
FIG. 2 is an elevational view of a trailer parked at a loading dock and showing an aspect of the loading-dock signaling system with the wheel chock in the securing position.
Figure 3:
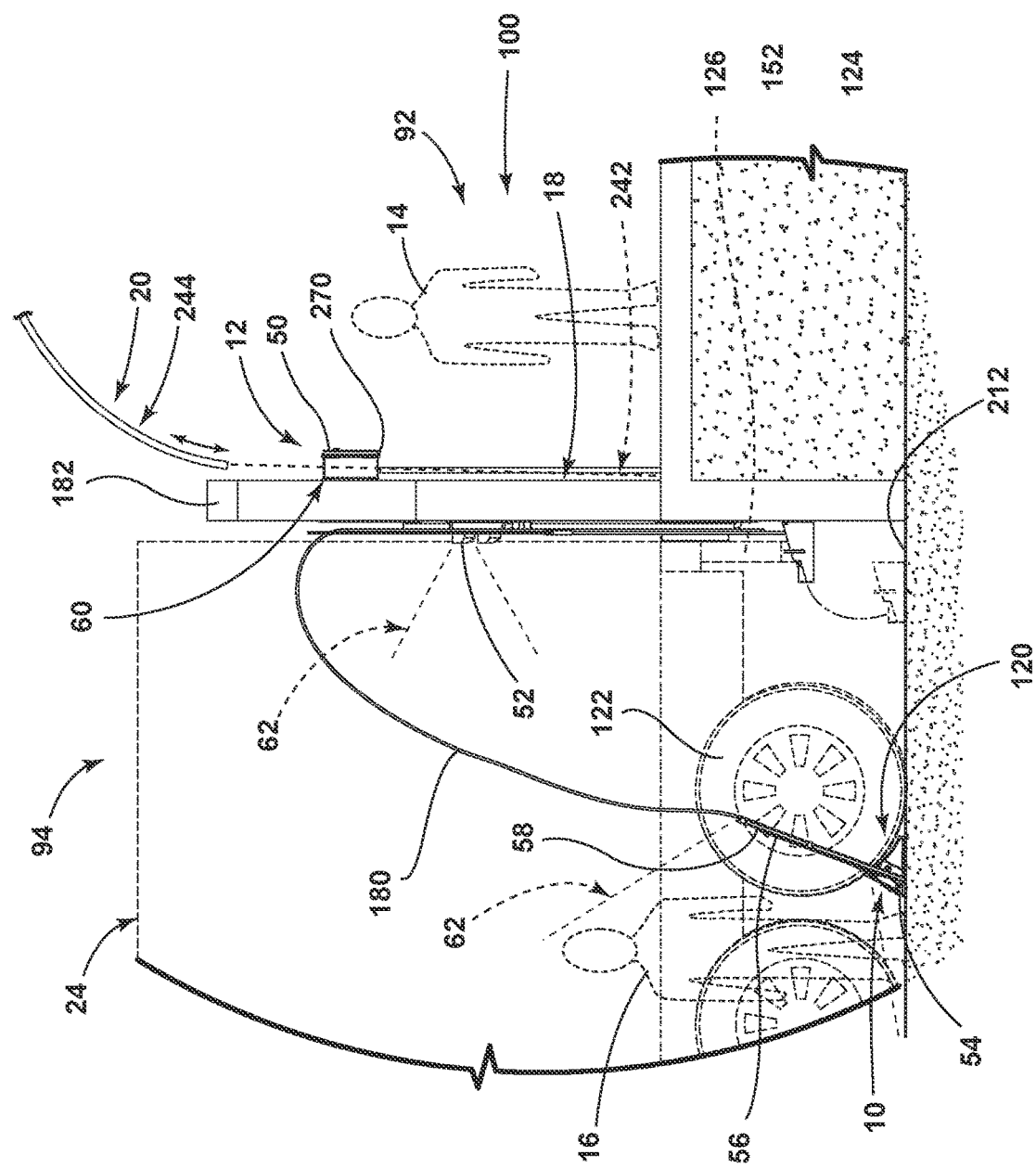
FIG. 3 is a cross-sectional view of the loading dock of FIG. 2 taken along line III-III.
Figure 4:
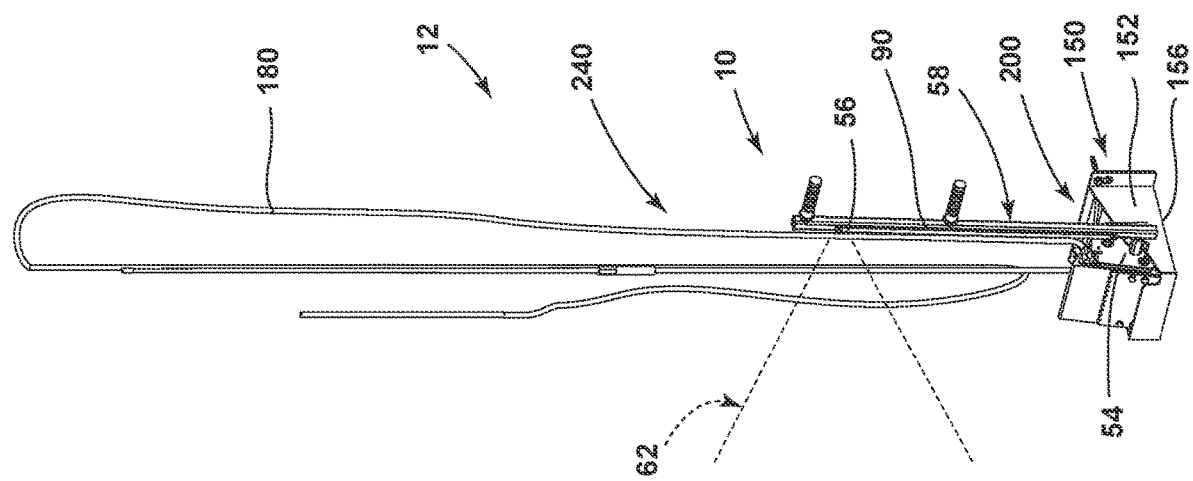
FIG. 4 is a perspective view of an aspect of a wheel chock for the loading-dock signaling system.
Figure 5:
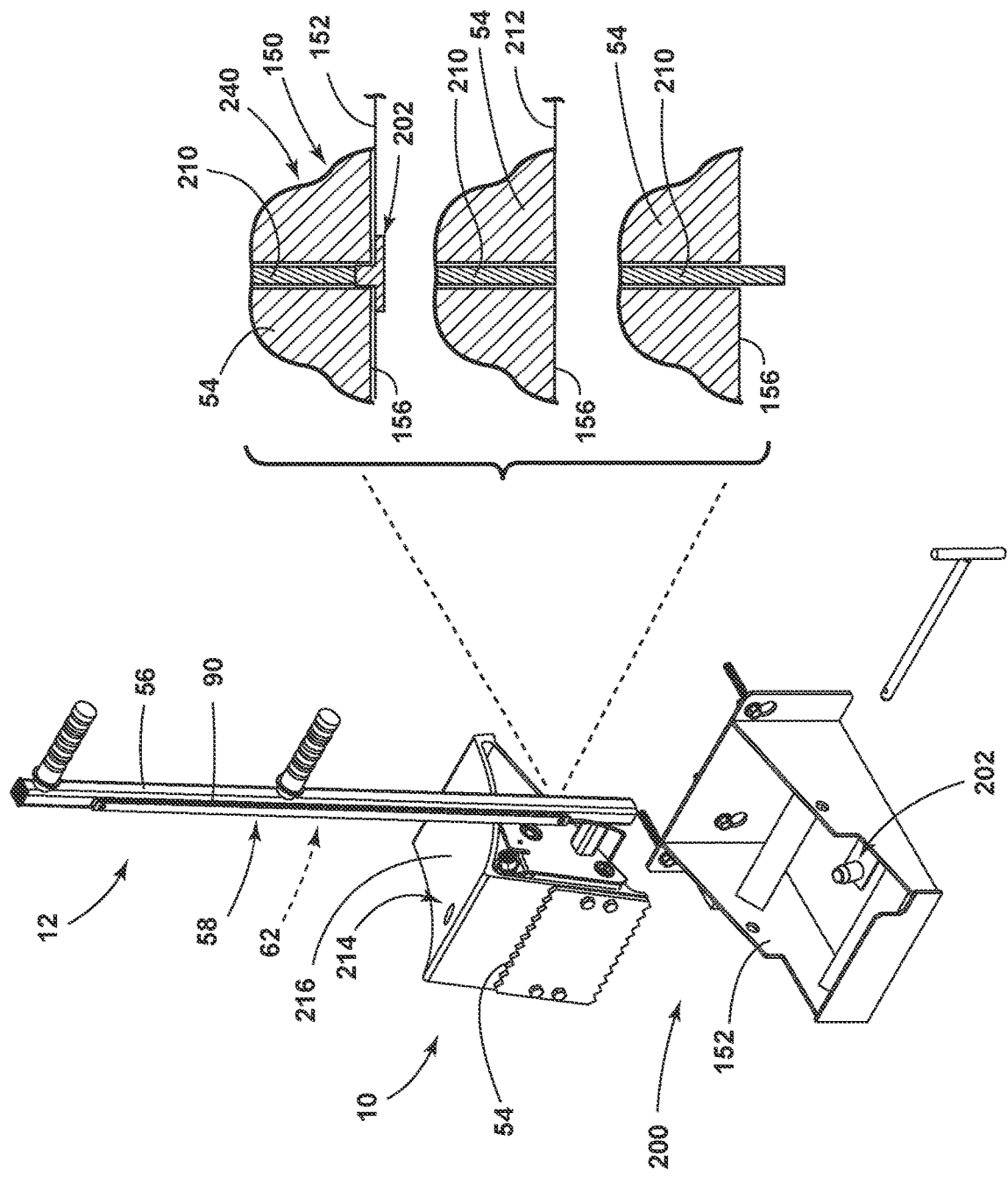
FIG. 5 is a partially exploded perspective view of the wheel chock of FIG. 4 for the loading-dock signaling system.
Figure 6:
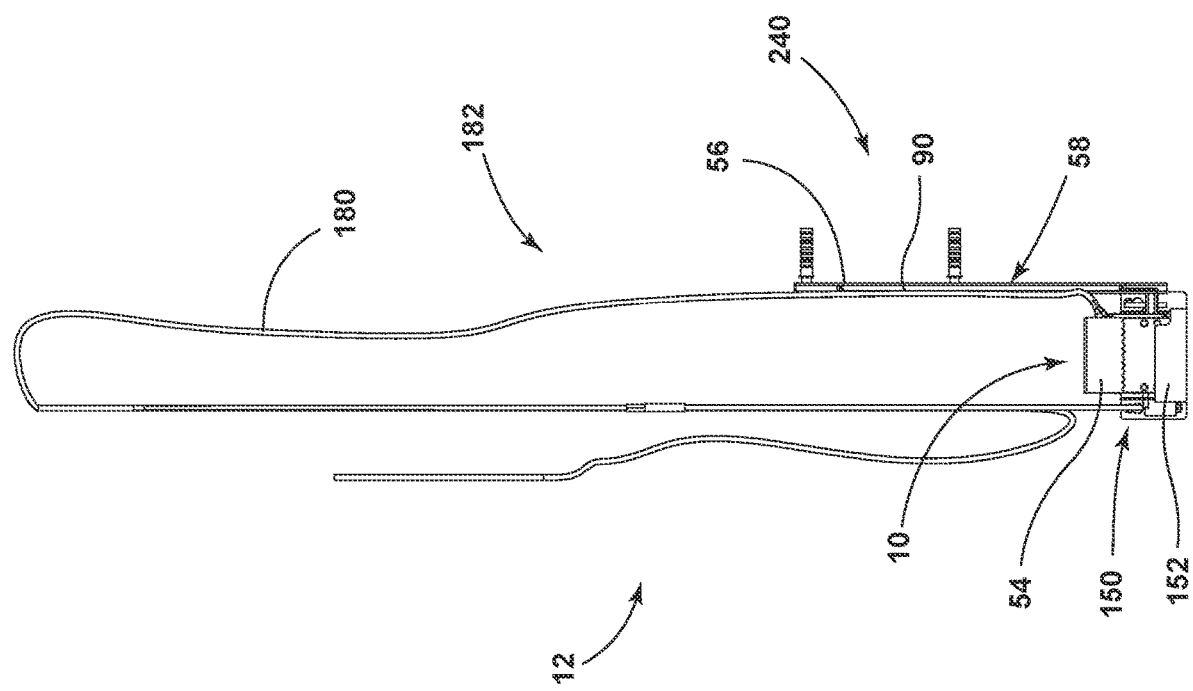
FIG. 6 is an elevational view of the wheel chock for the loading-dock signaling system of FIG. 4.
Figure 7:
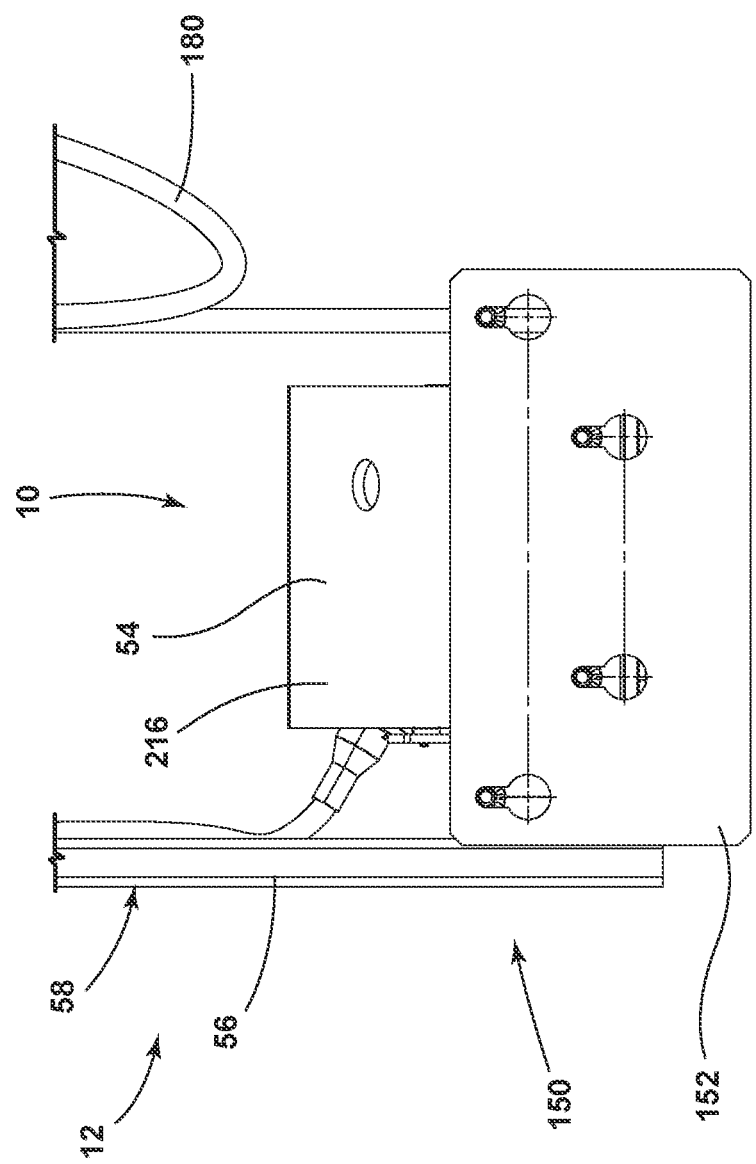
FIG. 7 is a rear elevational view of the cradle for receiving the wheel chock in the securing position.

According to various aspects of the device, as exemplified in FIGS. 1-3, the loading-dock signaling system 12, including the wheel chock 10, can be used as a stand-alone system with the loading dock 18. In such a configuration, once the wheel chock 10 is in a securing position 120 relative to a wheel 122 of the vehicle 24, the wheel chock 10 operates as a wheel restraint for limiting movement of a trailer or other vehicle 24 relative to the loading dock 18. In addition, the loading-dock signaling system 12 and the wheel chock 10 can be used in combination with vehicle restraints 124. Such vehicle restraints 124 can include barricade restraints, hook-type restraints, and other similar vehicle securing mechanisms that typically engage a rear impact guard 126 (sometimes referred to as an ICC bar) of a trailer or vehicle 24. In addition, where a vehicle 24 or trailer lacks the rear impact guard 126 or has a damaged rear impact guard 126, the wheel chock 10 of the loading-dock signaling system 12 can engage the wheel 122 of the vehicle 24 to serve as the primary restraint for maintaining the position of the vehicle 24 relative to the loading dock 18. In this manner, it is contemplated that the vehicle securing mechanisms operate with the wheel chock 10 and the loading-dock signaling system 12 to provide multiple layers of securing mechanisms for locating and securing the vehicle 24 relative to the loading dock 18.

While the terms "vehicle" and "trailer" are used in this specification, it should be understood that these terms can be used interchangeably to refer to any cargo-type vehicle. Such cargo-type vehicles can include, but are not limited to, tractor trailers, box trucks, flatbed trailers, and other similar cargo vehicles that are pulled by a separate vehicle or are attached onto a frame of a vehicle.

Referring again to FIGS. 1-3, the loading-dock signaling system 12 includes the wheel chock 10 that can be located in a stored position 150 within a cradle 152. The cradle 152 is typically mounted to a wall 182 of the loading dock 18. In this configuration, the cradle 152 is typically mounted on the driver's side 154 of the loading dock 18 so that the driver has easy visual access, as well as convenient physical access, to the wheel chock 10 for moving the wheel chock 10 from the stored position 150 to the securing position 120.

It is contemplated that the wheel chock 10 can be coupled with the controller 60 for the loading-dock signaling system 12 via a wireless network or via a wired connection that utilizes a hardwired cable 180 that couples the wheel chock 10 to the loading-dock signaling system 12 as well as to the wall 182 of the loading dock 18. The controller 60 is used to operate each of the internal signal light 50, the external signal light 52 and the chock signal light 58 to provide various communicative information, in the form of the illuminated indicia 62 to the inside personnel 14 and the outside personnel 16 during the parking of a vehicle 24 and the operation of the various components of the loading dock 18. It is contemplated that the controller 60 manages a repeatable system of operations that typically take place in a regular sequence with respect to the loading-dock signaling system 12, the vehicle 24, and the door 20 and dock leveler 22 of the loading dock 18. As will be discussed more fully below, certain exceptions to these sequences may be activated depending upon various actions that are outside of the regular sequence relative to the various equipment of the loading dock 18, the loading-dock signaling system 12 and the vehicle 24 itself. The controller 60 can be coupled inside the loading dock 18 and is communicatively coupled to the internal signal light 50, the external signal light 52 and the chock signal light 58 for providing the illuminated indicia 62 via each of these fixtures.

It is contemplated that the controller 60 and the internal and external signal lights 50, 52 and the chock signal light 58 can be installed during the construction of a particular dock structure 92 or loading dock 18. It is also contemplated that the loading-dock signaling system 12 can be incorporated within an existing loading dock 18 such that the loading-dock signaling system 12, and the controller 60 therefor, are installed within a loading dock 18 as a retrofit system within an existing dock structure 92.

Referring now to FIGS. 1-7, the wheel chock 10 includes a position sensing mechanism 200 for determining whether the wheel chock 10 is in a stored position 150, a securing position 120, or some position therebetween. The position sensing mechanism 200 of the wheel chock 10 can include a pin 210, typically a biased pin, or other physical or optical sensing mechanism that can be used for determining the location of the wheel chock 10. In certain aspects of the device, the pin 210 and cradle 152 can cooperate to produce a position of the pin 210 relative to the base 54 of the wheel chock 10 that is indicative of the wheel chock 10 being in the stored position 150 placed in the cradle 152. Typically, the pin 210 is outwardly biased to extend in an outward direction from an underside 156 of the base 54 of the wheel chock 10. When the base 54 of the wheel chock 10 is within the cradle 152, a protruding portion 202 of the cradle 152, which serves as a home indicator, positions the pin 210 at a predetermined position that is indicative of the stored position 150 within the cradle 152.

Referring again to FIGS. 1-7, when the wheel chock 10 is placed on the ground 212 in relation to a wheel 122 of a vehicle 24, the pin 210 of the position sensing mechanism 200 is inwardly biased by the ground 212 surrounding the base 54 of the wheel chock 10. In this position, the pin 210 is in a generally flush configuration or even position with respect to the surrounding area of the base 54. This flush position of the pin 210 indicates that the wheel chock 10 is placed on the flat surface, or generally flat surface, of the ground 212. An additional wheel sensor 214 of the position sensing mechanism 200 is positioned within a top portion 216 of the base 54 of the wheel chock 10. The wheel sensor 214 works in combination with the wheel 122 of the vehicle 24 and the pin 210 to determine whether the wheel chock 10 is properly positioned relative to the wheel 122 of the vehicle 24. The wheel sensor 214 determines whether an obstruction, such as the wheel 122 of the vehicle 24 is covering or otherwise engaging the wheel sensor 214. The top portion 216 of the base 54 is curved to generally match the shape of a wheel 122 for the vehicle 24. With this configuration, the wheel sensor 214 is typically calibrated to determine when an obstruction is within the curve of the top portion 216 of the base 54. This can assist in determining when the wheel chock 10 is under a wheel 122 as opposed to being next to a building or under a separate structure. In this manner, the wheel sensor 214 and the pin 210 of the position sensing mechanism 200 cooperate to determine a position of the wheel chock 10 relative to the vehicle 24.

When both of the pin 210 and the wheel sensor 214 of the position sensing mechanism 200 are not properly activated, this is an indication that the wheel chock 10 is not in the cradle 152 and also not in a proper securing position 120 relative to a wheel 122 of the vehicle 24. In addition, when the pin 210 is fully extended from the base 54, this is indicative of the wheel chock 10 being lifted off from the ground 212 and moved from the cradle 152 and toward the vehicle 24 or vice versa. This can also indicate that the chock 10 is not properly installed in the cradle 152 or may be tipped over on the ground 212. Using the pin 210 or other similar sensing mechanism, information can be provided to the controller 60 for activating various illuminated indicia 62 of the wheel chock 10, as well as the internal signal light 50 and the external signal light 52. As discussed above, each of these signal lights utilize a multi-chromatic system of illuminated indicia 62, as well as intermittent activation and deactivations of the multi-chromatic lighting elements 90 to produce various communicative signals that are received by the inside personnel 14 and the outside personnel 16 of the loading dock 18.

In conventional loading dock systems, only internal and external lights at the wall of the loading dock are utilized for providing information to personnel within and outside of the loading dock. In these conventional systems, these inside and outside lights that are mounted to the wall may be used to provide information related to a wheel restraint for restraining the wheels of a particular vehicle being parked at the dock. In such a system, an outside operator may not appreciate the existence of the conventional wheel restraint, or whether the wheel restraint is properly positioned.

Referring again to FIGS. 1-10, using the loading-dock signaling system 12 described herein, the multi-chromatic illuminated indicia 62 provided by the chock signal light 58 provides greater visibility of the wheel chock 10 to the outside personnel 16. The chock signal light 58 also provides information to the outside personnel 16 about whether the wheel chock 10 needs to be addressed in some fashion. This illuminated indicia 62 from the wheel chock 10 can provide information to the outside personnel 16 that the wheel chock 10 needs to be placed relative to the wheel 122 of the vehicle 24, needs to be placed back into the stored position 150 or is improperly located relative to the wheel 122 or the cradle 152. This communicative information that is produced directly from the wheel chock 10, in combination with the internal and external signal lights 50, 52, provides for more efficient and consistent usage of the wheel chock 10. This system of illuminated indicia 62 provided by the internal, external and chock signal lights 50, 52, 58 also provides a generally universal system of information that can be appreciated by large numbers of vehicle operators from a wide range of geographic regions.

Drivers and other vehicle operators may be required to interact with a large number of loading dock systems during their travels to various dock structures 92, such as distribution facilities. Each of these distribution facilities may have a different loading dock system. Using the loading-dock signaling system 12 described herein, each of these loading docks 18 can provide a wheel chock 10 that promotes an intuitive and consistent form of illuminated indicia 62 that is clearly seen by outside personnel 16 and easily distinguishable from the internal signal light 50 and external signal light 52 of the loading-dock signaling system 12. Accordingly, the loading-dock signaling system 12 produces more consistent usage of the wheel chock 10, either as a stand-alone system, or in combination with other vehicle restraints 124.

Referring now to FIGS. 8-10, various exemplary and non-limiting sequences of the loading-dock signaling system 12 are presented. Other similar sequence of operations may be used in combination with the loading-dock signaling system 12. In addition, while certain colors of lights are described herein, it should be understood that other colors of lighting elements 90 and illuminated indicia 62 can be used without deviating from the concepts described herein.

As exemplified in FIG. 8, a sequence is provided for parking and securing a vehicle 24 relative to the loading dock 18, as well as operating the loading dock 18 and the loading-dock signaling system 12. When the loading dock 18 is in an idle state 240, where no vehicle 24 is parked or approaching the loading dock 18, the loading-dock signaling system 12 can show a green light at the external signal light 52, indicative of a loading dock 18 that is ready to be used. Conversely, the internal signal light 50 may show a red light indicative of the door 20 needing to remain in a closed position 242 to avoid inadvertent access through the loading dock 18 when no vehicle 24 is present.

When a vehicle 24 approaches the loading dock 18, the external signal light 52 can change from a green light to a red light indicating that a vehicle 24 is approaching and is going to be parked at the loading dock 18. Simultaneously, the chock signal light 58 is illuminated either as a solid light, a flashing light, or other similar illuminated indicia 62. This illuminated indicia 62 from the chock signal light 58 provides the outside personnel 16 within the exterior dock area 94 with a cue that the wheel chock 10 needs to be manipulated in some fashion once the vehicle 24 is parked at the loading dock 18. Typically, this illuminated indicia 62 will instruct the outside personnel 16 to move the wheel chock 10 from the stored position 150 in the cradle 152 to the securing position 120 relative to the wheel 122 of the vehicle 24 after being parked at the loading dock 18. As the vehicle 24 approaches the loading dock 18, the door 20 of the loading dock 18 remains in the closed position 242 and the internal signal light 50 remains a solid red indicating to the interior dock area 100 that it is still unsafe to move the door 20 to the open position 244. In this configuration, when the chock signal light 58 is providing the illuminated indicia 62 indicating that the wheel chock 10 needs to be moved from the cradle 152 to the securing position 120, the door 20 may be incapable of being opened and the dock leveler 22 is also prevented from being operated. This interlock on the door 20 can be provided through the controller 60 for the loading-dock signaling system 12 or through another similar interlock mechanism for preventing operation of the door 20 to the open position 244 as well as the dock leveler 22 when it is unsafe to do so.

Referring again to FIG. 8, when the vehicle 24 is parked at the loading dock 18, outside personnel 16 are prompted by the chock signal light 58 of the wheel chock 10 to place the wheel chock 10 in the securing position 120. Once in the securing position 120, and the vehicle restraint 124 is engaged, the illuminated indicia 62 of the chock signal light 58 changes to an alert signal, such as a red light indicating that the wheel chock 10 is not to be removed from the securing position 120. In addition, the internal signal light 50 can modify its illuminated indicia 62 to show a flashing yellow or some other different condition indicating that it is safe to operate the door 20 of the loading dock 18. As the door 20 is moved to the open position 244, the internal signal light 50 can change to a solid red light indicating that it is unsafe to approach the loading dock 18 as the door 20 operates. In addition, during this action of the door 20 moving to the open position 244, it is contemplated that the dock leveler 22 or other similar loading dock mechanism can be deployed to extend between the loading dock surface and the vehicle 24. After the door 20 is fully moved to the open position 244 and the dock is deployed, the internal signal light 50 can change to a green or other similar "all clear" indication to let inside personnel 14 know that it is safe to move through the loading dock 18 and into the vehicle 24 for loading or unloading the vehicle 24. As the inside personnel 14 are operating to load or unload the vehicle 24, the external signal light 52 and the chock signal light 58 remain as a solid red light indicating that the wheel chock 10 is not to be removed and the vehicle 24 is not to be moved from its current position.

Referring now to FIG. 9, which illustrates an exemplary process for separating the vehicle 24 from the loading dock 18, after loading or unloading of the vehicle 24 is complete, the loading-dock signaling system 12 operates to provide indications to the inside and outside personnel 14, 16 within the respective interior dock area 100 and the exterior dock area 94 about the status of the various components of the loading dock 18 and the loading-dock signaling system 12. After loading and unloading the vehicle 24 is complete, the dock leveler 22 is restored to an upright position within the loading dock area. As the dock leveler 22 is restored, the internal signal light 50 shows a solid red indicating that it is now unsafe to approach the loading dock area. After the dock is restored, the door 20 for the loading dock 18 is operated to the closed position 242.

After the door 20 is closed, a dock operator within the interior dock area 100, typically one of the inside personnel 14, manually provides a release restraint interface 270, such as a button. This release restraint interface 270 initiates as illuminated indicia 62 informing the outside personnel 16 that the wheel chock 10 can be removed so that the vehicle 24 can be transferred away from the loading dock area. When the release restraint interface 270 is engaged, the chock signal light 58 changes from a red illuminated indicia 62 to a green or white illuminated indicia 62 and the external signal light 52 alternately flashes between green and red illuminated indicia 62. These external illuminated indicia 62 provide information to the outside personnel 16 that action needs to be taken with respect to the vehicle 24 and the wheel chock 10. When the wheel chock 10 is moved from the securing position 120 back to the stored position 150 within the cradle 152, the chock signal light 58 deactivates and the external signal light 52 illuminates a green illuminated indicia 62 indicating that it is safe to move the vehicle 24 away from the loading dock area.

As discussed above, this particular combination of illuminated indicia 62 of the internal signal light 50, external signal light 52 and chock signal light 58 is indicative of an idle state 240 of the loading dock 18. Again, this idle state 240 of the loading dock 18 is indicative of the loading dock 18 being ready to receive another vehicle 24 being parked relative to the loading dock 18.

Referring now to FIG. 10, according to various aspects of the device, and as discussed above, certain exceptional occurrences that are outside of the typical sequence may happen relative to the loading-dock signaling system 12. When these outside occurrences happen, certain exceptional communications are configured to be provided by the loading-dock signaling system 12 to the inside and outside personnel 14, 16 within the interior dock area 100 and the exterior dock area 94, respectively. In these situations, the loading-dock signaling system 12 can incorporate an auditory signal, in addition to the illuminated indicia 62 provided by the internal signal light 50, the external signal light 52 and the chock signal light 58 of the wheel chock 10. The use of the auditory signal indicates that action needs to be taken in an expedient fashion to correct or realign the placement or location of certain components of the loading dock 18 or the loading-dock signaling system 12. Again, the use of the wheel chock 10 and the chock signal light 58 provides additional alerting illuminated indicia 62 to outside personnel 16 about the status of the loading dock 18, the loading-dock signaling system 12 and the vehicle 24. In particular, the illuminated indicia 62 of the chock signal light 58 can provide information that a component is not properly aligned or is out of place with respect to the vehicle 24 or the loading dock 18. This additional information can provide a more sophisticated and complete set of instructions to the outside personnel 16 to better appreciate the condition that may need correction or modification.

As exemplified in FIG. 10, where wheel chock 10 is prematurely disengaged or moved out of the securing position 120, various alarms trigger both within the exterior dock area 94 and the interior dock area 100 of the loading dock 18. These alarms can include the internal signal light 50 and the chock signal light 58 each flashing red, and the external signal light 52 showing a solid red light. In certain situations, the wheel chock 10 may serve as the primary mechanism for maintaining the vehicle 24 in position relative to the loading dock 18. Accordingly, the flashing red illuminated indicia 62 indicates that the wheel chock 10 should not be removed. This condition can be accompanied by use of the auditory alarm to indicate that action needs to be taken in an expedient fashion.

Referring again to FIG. 10, where the vehicle restraint 124 is engaged and the wheel chock 10 is placed in the securing position 120, it may be determined that certain actions need to taken by inside personnel 14. However, because the outside personnel 16 may not be able to see what is going on within the inside of the loading dock structure 92, the outside personnel 16 have no knowledge about a delay. In such an instance, it is contemplated that the chock signal light 58 can change from a red to a green illuminated indicia 62 indicating that the outside personnel 16 have completed all necessary steps and action is required by inside personnel 14 so that loading or unloading can proceed. In this condition, the external signal light 52 can indicate a solid red illuminated indicia 62, the chock signal light 58 can show a green illuminated indicia 62 and the internal signal light 50 can show a flashing red illuminated indicia 62 to indicate that some action needs to be taken by inside personnel 14.

As exemplified in FIG. 10, the wheel restraint is to be removed after completion of loading and unloading of the vehicle 24 and is required to be placed back into the stored position 150 within the cradle 152. This action is used to initiate the idle state 240 of the loading-dock signaling system 12. When the wheel chock 10 is not placed back into the cradle 152 and into the storage position, an audible alarm can trigger after a certain amount of time. In addition, the chock signal light 58 can show a flashing green illuminated indicia 62 indicating that some action needs to be taken with respect to the wheel chock 10. In this case, the wheel chock 10 is required to be placed back into the cradle 152 and the storage position. In addition, the internal signal light 50 can show a flashing or red signal indicating that some action needs to be taken. Where the outside personnel 16 have left the facility, only inside personnel 14 can be available to move the wheel chock 10 back to the cradle 152 and into the storage position. Accordingly, the flashing red illuminated indicia 62 of the internal signal light 50 provides the appropriate communication to the inside personnel 14. In addition, the flashing green light of the wheel chock 10 makes the wheel chock 10 easier to see so that it can be placed back into the cradle 152 so that the idle state 240 can be initiated.

As exemplified in FIG. 10, in another exception condition, the door 20 may be closed after loading or unloading is complete. In certain situations, this may be unnoticed by the outside personnel 16. In such an instance, the chock signal light 58 may flash green indicating that some action needs to be taken by the outside personnel 16. The outside personnel 16, via the illuminated indicia 62, are prompted to relocate the wheel chock 10 from the securing position 120 to the stored position 150 by placing the wheel chock 10 into the cradle 152. In addition, an audible alarm may trigger after a certain amount of time to indicate a higher level alert to the outside personnel 16.

According to the various aspects of the device, where some action is to be performed by outside personnel within the exterior dock area 94, a corresponding signal or alert may be displayed or otherwise indicated by the controller 60 within the interior dock area 100. The controller 60 is typically used to manage and indicate the various steps and actions that are to be taken with respect to the various components of the loading dock 18. This can include, but is not limited to, the wheel chock 10, the vehicle restraint 124, the door 20, the dock leveler 22 and other similar components of the loading dock 18.

Referring again to FIG. 10, where a vehicle 24 is left at the loading dock 18 overnight with the loading dock door 20 in a closed position 242, the external signal light 52 may show a solid red light, as well as the internal signal light 50. The chock signal light 58 may show a green light indicating that the vehicle restraint 124 is properly engaged, but no loading or unloading is taking place with respect to the vehicle 24.

Each of the conditions exemplified in FIGS. 8-10 may be accompanied by solid lights, flashing lights, combinations thereof, different colored lights, combinations of colors and signals, and other similar illuminated indicia 62 for communicating various information to the inside personnel 14 and the outside personnel 16.

Figure 12:
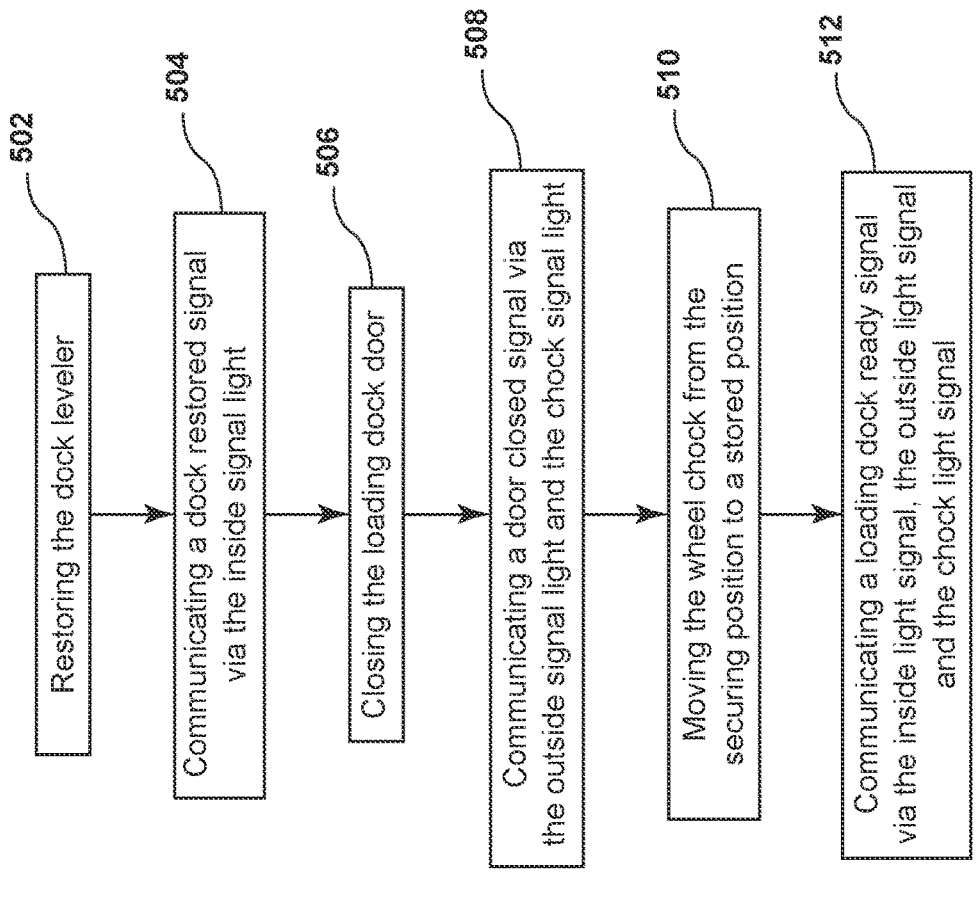
FIG. 12 is a linear flow diagram illustrating a method for separating a trailer from a loading dock utilizing an aspect of the loading-dock signaling system.

Referring now to FIGS. 11 and 12, having described various aspects of the loading-dock signaling system 12, methods 400 and 500 are disclosed for operating a loading-dock signaling system 12 having an external signal light 52, an internal signal light 50 and a chock signal light 58 of a wheel chock 10. According to various aspects of the device, the method 400 includes various steps used to park and secure a vehicle 24 relative to a loading dock 18. Accordingly, the method 400 includes a step 402 of initiating a docking sequence, wherein the external signal light 52 and a chock signal light 58 of the wheel chock 10 cooperate to provide an alert to the exterior dock area 94 for an outside operator to place the wheel chock 10 in a securing position 120. According to step 404 of the method 400, the wheel chock 10 is placed in the securing position 120. After the wheel chock 10 is in the securing position 120, a chock engaged signal is communicated via operation of the internal signal light 50 and the chock signal light 58 (step 406). At that point, the loading dock door 20 can be operated from a closed position 242 to an open position 244 (step 408). According to the method 400, a door operating signal is communicated via the chock signal light 58 and the internal signal light 50 alerting that the door 20 is being operated (step 410). When the door 20 is opened, a dock leveler 22 is deployed (step 412). A dock deployed signal is communicated (step 414) via the inside signal light. At this point, the inside and outside personnel 14, 16 understand that it is acceptable to load and unload materials relative to the vehicle 24.

Referring now to FIG. 12, after loading and unloading is complete, a method 500 is implemented to separate the vehicle 24 from the loading dock 18 and return the loading dock 18 to the idle position. According to the method 500, the dock leveler 22 is restored, or moved to a position within the loading dock 18 (step 502). A dock restored signal is then communicated via the internal signal light 50 (step 504). The loading dock door 20 is then closed (step 506). A door closed signal is communicated via the external signal light and the chock signal light 58 (step 508). The wheel chock 10 is then moved from the securing position 120 to the stored position 150 within the cradle 152 (step 510). A loading dock ready signal is then communicated via the internal signal light 50, the external signal light 52 and the chock signal light 58 (step 512). This loading dock ready signal is indicative of the idle state 240 described above. Again, in this idle state 240, the loading dock 18 is communicating a signal that it is ready to receive a vehicle 24 for loading or unloading.

According to various aspects of the device, the loading-dock signaling system 12 uses the multi-chromatic illuminating indicia of the chock signal light 58 of the wheel chock 10 to provide additional information to the outside personnel 16 with respect to the vehicle 24, the wheel chock 10, and components of the loading dock 18. Using the chock signal light 58, the wheel chock 10 has prominent visibility and is an integral piece of the loading-dock signaling system 12. Accordingly, various steps of the loading and unloading process require action to be taken with respect to the wheel chock 10 in order for certain components of the loading dock 18 to be operated. As discussed above, it is contemplated that the door 20 cannot be opened within the loading dock 18 until the wheel chock 10 is properly located in the securing position 120. This interlock mechanism provides an added layer of protocol for ensuring that proper processes are followed with respect to the loading dock 18 and the loading-dock signaling system 12.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A loading-dock signaling system comprising:
    an internal signal light;
    an external signal light;
    a wheel chock having a base and a handle extending from the base, wherein a chock signal light is positioned on the handle, and wherein the internal signal light, the external signal light and the chock signal light are in signal communication with one another to provide at least a plurality of illuminated indicia to an exterior dock area and an interior dock area, wherein the exterior dock area and the interior dock area are separated by a dock door; and
    a loading dock that includes at least the dock door, wherein the plurality of illuminated indicia relate to a status of the dock door relative to a vehicle stationed at the loading dock, wherein
        at least one chock signal light of a plurality of chock signal lights includes a multi-chromatic lighting element;
        the dock door is in communication with at least the chock signal light and the internal signal light; and
        operation of the dock door between an open position and a closed position is reflected via the plurality of illuminated indicia of the chock signal light and the internal signal light.

2. The loading-dock signaling system of claim 1, wherein the chock signal light is a multi-chromatic illuminated strip light that extends along a surface of the handle.

3. The loading-dock signaling system of claim 1, wherein the loading dock includes a vehicle restraint, wherein the plurality of illuminated indicia relate to a status of the vehicle restraint relative to the vehicle stationed at the loading dock.

4. The loading-dock signaling system of claim 3, wherein the wheel chock includes a position sensing mechanism that determines a location of the wheel chock relative to the loading dock and the vehicle.

5. The loading-dock signaling system of claim 4, wherein the position sensing mechanism is a biased pin that is biased outward from the base of the wheel chock.

6. The loading-dock signaling system of claim 5, wherein the pin engages a home indicator on a cradle to define a stored position and wherein the pin is disposed flush with the base in a use position, the use position being further defined by the base of the wheel chock resting on a flat surface.

7. The loading-dock signaling system of claim 6, wherein the position sensing mechanism also includes a wheel sensor that is positioned proximate a top portion of the base, wherein the wheel sensor operates to determine when an obstruction is positioned above the base.

8. The loading-dock signaling system of claim 7, wherein the pin and the wheel sensor cooperate to at least partially control the internal signal light, the external signal light and the chock signal light.

9. The loading-dock signaling system of claim 3, wherein the wheel chock is attached to a controller of the loading dock via a wired connection.

10. A loading dock assembly comprising:
    a loading dock door, that selectively separates an interior dock area from an exterior dock area;
    a wheel chock having a base and a handle extending from the base; and
    a loading-dock signaling system that includes an internal signal light, an external signal light and a chock signal light, wherein the chock signal light includes a multi-chromatic lighting element attached to the handle and that illuminates according to a status of at least the loading dock door and the wheel chock, wherein the loading dock door is in communication with at least the chock signal light and the internal signal light, and wherein operation of the dock door between an open position and a closed position is reflected via the plurality of illuminated indicia of the chock signal light and the internal signal light.

11. The loading dock assembly of claim 10, wherein the chock signal light also operates to communicate information relative to the wheel chock in relation to a vehicle stationed proximate the loading dock door.

12. The loading dock assembly of claim 11, wherein the internal signal light, the external signal light and the chock signal light are in signal communication via a controller to communicate information regarding the vehicle, the loading dock door and the wheel chock to provide a plurality of illuminated indicia to at least a vehicle operator positioned within the exterior dock area and a dock operator positioned within the interior dock area.

13. The loading dock assembly of claim 12, wherein the wheel chock includes a positioning mechanism that determines a location of the wheel chock relative to a cradle for the wheel chock and the vehicle.

14. The loading dock assembly of claim 13, wherein the wheel chock, the chock signal light and the positioning mechanism are coupled to the controller via a wired connection.

15. The loading dock assembly of claim 14, wherein the positioning mechanism includes a biased pin that is biased in an outward direction through an underside of the base, wherein the biased pin cooperates with a home cradle to define a stored position of the wheel chock, a home position defined by a predetermined position of the biased pin relative to the base.

16. The loading dock assembly of claim 15, wherein the use position of the wheel chock is defined by a flush configuration of the biased pin relative to the base that is indicative of the wheel chock resting on a flat surface.

17. A method of operating a loading dock signal system having an external signal light, an inside signal light and a wheel chock, the method comprising:
   initiating a docking sequence via a controller, wherein the external signal light and a chock signal light of the wheel chock cooperate to alert an outside operator to place the wheel chock in a securing position relative to a vehicle;
   placing the wheel chock in the securing position relative to the vehicle;
   communicating a chock engaged signal via cooperation of the inside signal light and the chock signal light;
   opening a loading dock door;
   communicating a door operating signal via the chock signal light and the inside signal light;
   deploying a dock leveler after the loading dock door is moved into an open position;
   communicating a dock deployed signal via the inside signal light;
   restoring the dock leveler;
   communicating a dock restored signal via the inside signal light;
   closing the loading dock door;
   communicating a door closed signal via the external signal light and the chock signal light;
   moving the wheel chock from the securing position to a stored position; and
   communicating a loading dock ready signal via the inside signal light, the external signal light and the chock signal light.

18. The method of claim 17, wherein the wheel chock is coupled with the controller via a wired connection.

* * * * *